United States Patent [19]

Kanda et al.

[11] Patent Number: 5,168,398
[45] Date of Patent: Dec. 1, 1992

[54] HEAD POSITIONING CONTROL APPARATUS FOR A DATA STORAGE DEVICE

[75] Inventors: Hiroyuki Kanda, Oome; Yasumasa Kawai, Fussa, both of Japan

[73] Assignee: Kabushiki Kaisha Toshiba, Kawasaki, Japan

[21] Appl. No.: 557,082

[22] Filed: Jul. 25, 1990

[30] Foreign Application Priority Data

Jul. 28, 1989 [JP] Japan .................... 1-194066

[51] Int. Cl.⁵ .................... G11B 5/55; G11B 21/08
[52] U.S. Cl. .................... 360/78.04; 360/77.04; 369/44.29
[58] Field of Search .................... 360/75, 77.02–77.05, 360/77.07–77.11, 78.04–78.14; 369/32, 44.29, 44.31

[56] References Cited

U.S. PATENT DOCUMENTS

| | | | |
|---|---|---|---|
| 4,086,636 | 4/1978 | Cizmic et al. .................... | 360/75 |
| 4,949,201 | 8/1990 | Abed .................... | 360/78.07 |
| 5,062,023 | 10/1991 | Squire .................... | 360/78.04 |

Primary Examiner—Jerry Smith
Assistant Examiner—Steven R. Garland
Attorney, Agent, or Firm—Finnegan, Henderson, Farabow, Garrett and Dunner

[57] ABSTRACT

In a servo system for a hard disk drive, an integrating circuit for eliminating an offset of a head has its capacitor charged to an extent corresponding to an offset amount, at a time of a track following control operation, before an integral action is done. The integrating circuit performs the integral action through the utilization of the charged capacity to eliminate the offset amount of the head. A CPU retrieves an initially prepared offset table for one of voltage level data corresponding to the offset amount which is determined in accordance with a head's destination track. A D/A converter converts the voltage level data which comes from CPU to a voltage and supplies it to the capacitor in the integrating circuit.

9 Claims, 5 Drawing Sheets

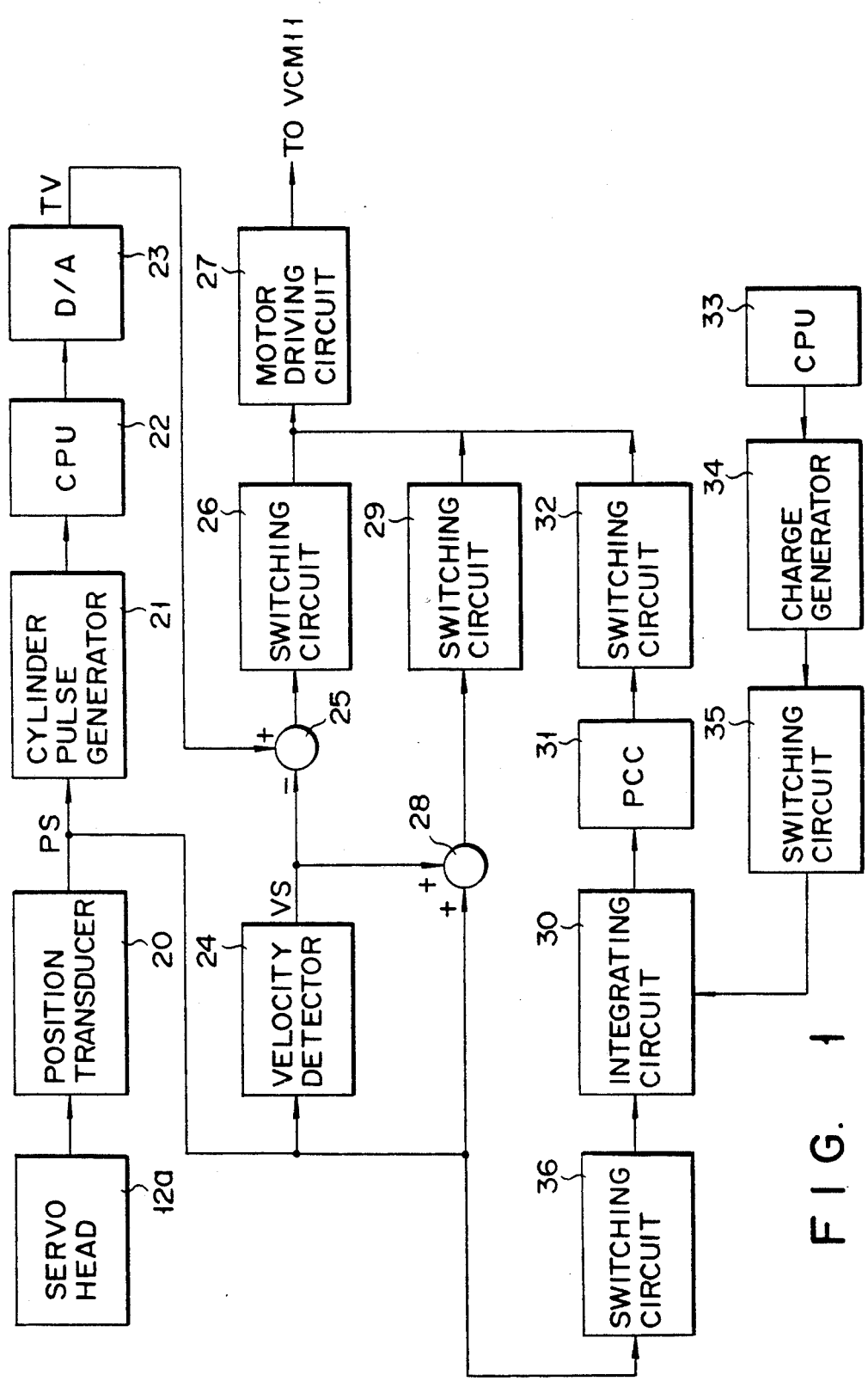
F I G. 1

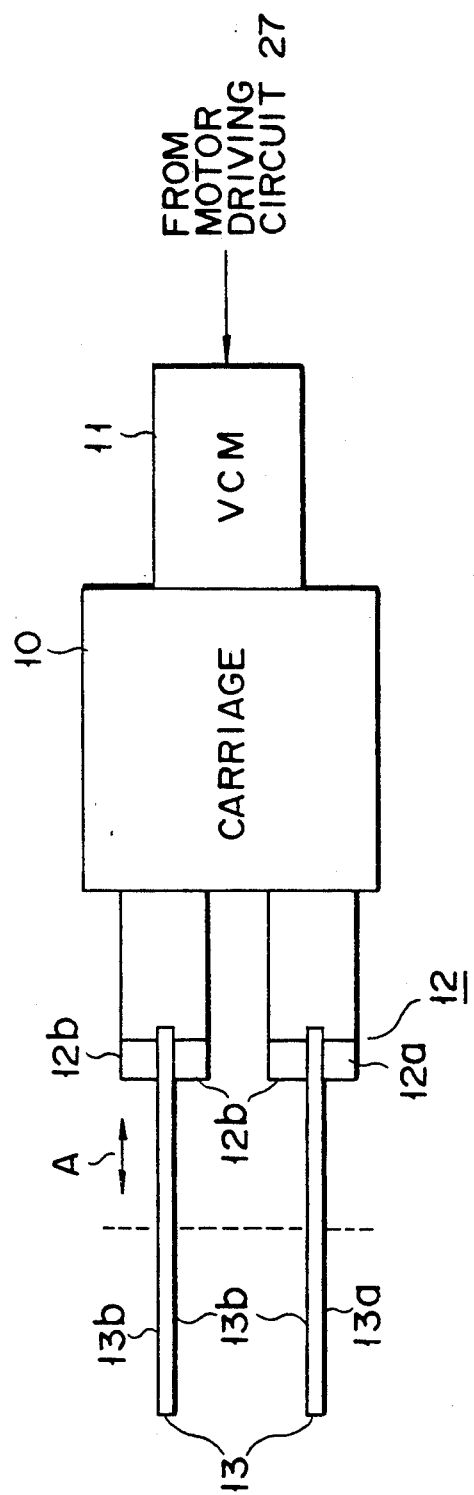
F I G. 2

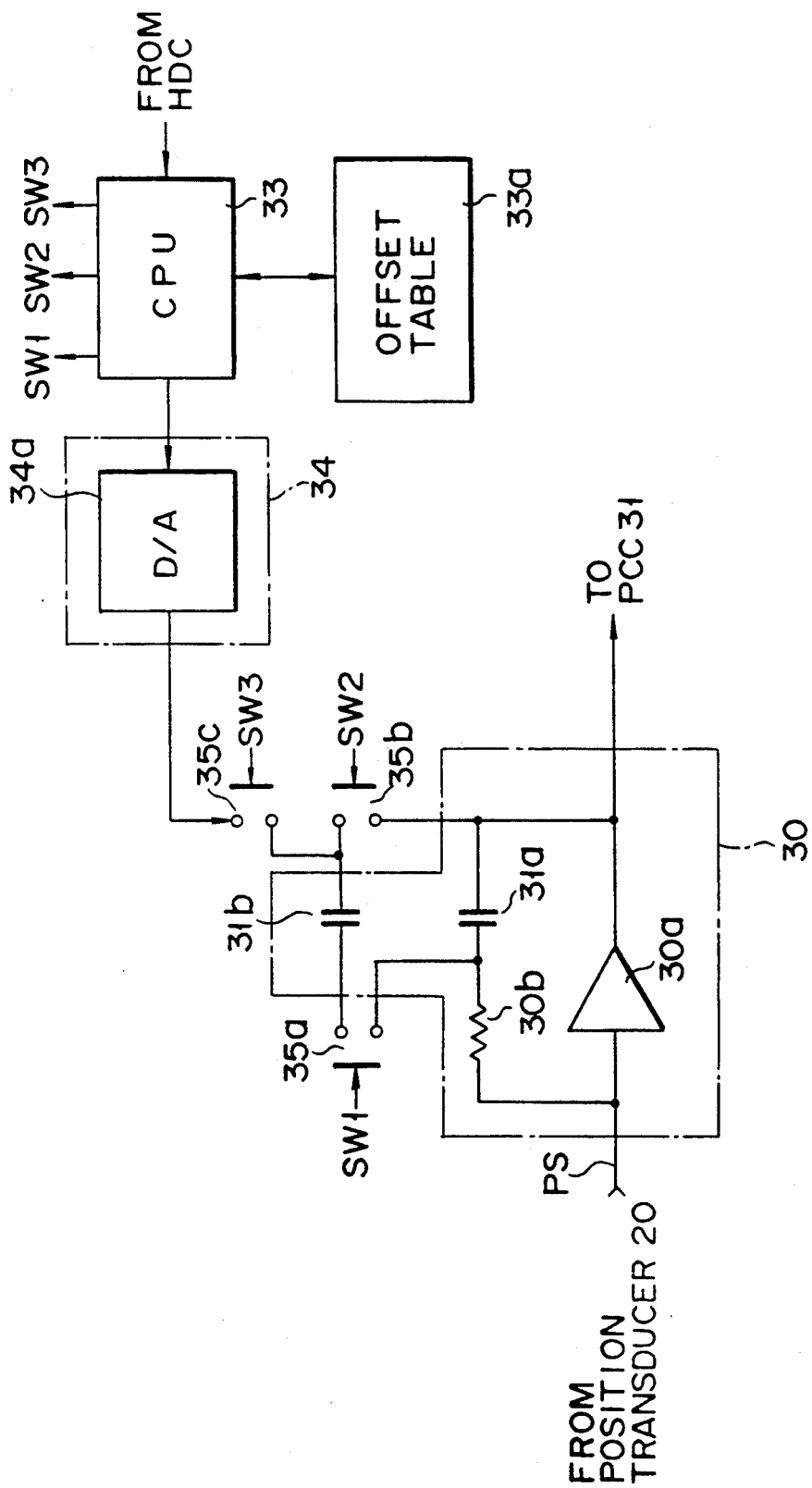
F I G. 3

HEAD POSITIONING CONTROL APPARATUS FOR A DATA STORAGE DEVICE

BACKGROUND OF THE INVENTION

1. Field of the Invention

The present invention relates to a servo system for positioning a read/write head over a destination track of a recording medium and, in particular, to a servo system for use in a hard disc drive.

2. Description of the Related Art

In a hard disk drive (HDD) of a conventional type, a head is moved to a destination track (destination cylinder) on a disk (recording medium) and the head reads and writes data from and into the destination track. An associated servo system performs a seek control operation for positioning the head over the destination track of the disk. The seek control operation of the servo system includes a speed control operation, transient control operation (stop control operation) and positioning control/operation (track following operation).

The speed control operation controls the moving velocity of the head to allow the head to follow a target speed in accordance with a distance from a current position to a destination track. The track following operation allows the head, which is moved by the speed control operation to the destination track, to be positioned at the center of the destination track. The transient control operation settles the state of the head when a shift is made from the speed control operation to the track following operation.

The servo system detects the current position (current track) of the head over the disk through the utilization of initially recorded servo data and performs a seek operation on the basis of the current position. The servo data is recorded on the dedicated servo surface of the disk. Some servo systems at a track following action, utilize embedded servo data recorded on the data surface of the disk.

Two head types are known, one being a servo head corresponding to a dedicated servo surface and the other being a plurality of data heads corresponding to a data surface. The servo head reads the servo data out of the dedicated servo surface and outputs it to a position signal generator. The position signal generator delivers a position signal, as an output, corresponding to the current position of the head. The servo head and respective data head are mounted on a carriage and moved in a radial direction of the disk by driving the carriage. The data head follows the servo head, which is subjected by the servo system to positioning control, and is moved to the destination track of the disk.

During the speed control in the servo system, a microprocessor (CPU) calculates, based on a position signal output from the position transducer, a target speed necessary for the head (data head) to move up to the destination track. A velocity detector differentiates a position signal output from the position signal generator and detects the actual speed of the movement of the head. An error amount (voltage signal) between the actual speed and the target speed is transduced to a drive current of a voice coil motor (VCM) for driving the carriage. By so doing, the carriage is so controlled as to be driven at the target speed. It is, thus, possible to move the head to the destination track.

Upon the movement of the head, by the speed control operation, to a proximity position which is one track behind the destination track, the servo system allows a shift from the speed control operation to the transient control operation. In the transient control operation, a velocity signal output from the velocity detector and position signal output from the position signal generator are added to produce a result of addition. The result is transduced to a drive current of VCM. The head is moved, by the transient control operation, steadily over the destination track. Then the servo system allows a shift from the transient control operation to the position control operation. In the track following control operation, a negative feedback operation is implemented to allow a position signal to become zero. It is, thus, possible to position the head at the center of the destination track.

In the track following control operation, upon the positioning of the head at the center of the destination track, an offset occurs due to the rotational variation of the disk, sometimes producing a positional displacement of the head. In order to eliminate such an offset, an integrating circuit is provided for integrating a position signal over a low-pass frequency region. A position signal, which is integrated by the integrator, has its phase compensated by a phase compensation circuit and is converted to a drive current. The phase compensation circuit is composed of a filter, such as a notch filter and lead lag filter, and adapted to suppress a resonance point in a mechanical system, such as a carriage and to prevent an oscillation phenomenon resulting from a phase delay.

In the track following control operation of the servo system, the integrator integrates a position signal so as to eliminate a offset resulting from the rotational variation of the disk. The integrator is composed of an operational amplifier and a series circuit of a resistor and capacitor and determines the time of an integral action in accordance with the capacitance of a capacitor. The offset amount varies in accordance with a destination track over which the head is occupied, that is, with the tracks classified broadly into an outer, intermediate and inner area, the offset amount varies from area to area of the disk. For this reason, it sometimes takes a relatively long time to perform an integral action by the integrator for offset elimination, though depending upon the destination track over which the head is occupied. At the time of the integral action, the head is not positioned at the center of the destination track, resulting in an unsteady state. After the track following control operation has been terminated, the servo system gives a seek end instruction to a host computer via a hard disk controller (HDC). At the time of track following control operation, a relatively long time is required, with a passage of a time for integral action by the integrator, until the seek end instruction is given to the host computer. This provides a cause for a reduced speed of access to the HDD.

SUMMARY OF THE INVENTION

It is accordingly an object of the present invention to provide a servo system which, at a time of track following control operation, can shorten a time for an integral action to be done by an integration circuit for offset elimination to allow a head to be positioned over a destination track under a high-speed seek operation and thus, allow an HDC to gain high-speed access.

According to the present invention, there is provided a servo system for positioning a head, comprising:

a head driving unit for moving the head to a destination track, at a time of seek control operation, corresponding to one in a recording medium having head positioning servo data initially recorded thereon and for positioning the head to a center of the destination track at a time of track following control operation;

a position signal generator for generating a position signal corresponding to a current position of the head thus moved in accordance with the servo data read by the head out of the recording medium;

an integrating circuit for integrating the position signal, which is output from the position signal generator, at the time of track following control operation, in accordance with a capacitance of a capacitor in the integrating circuit;

a signal supply unit for supplying a voltage signal which is output from the integrating circuit to the head driving unit at the time of track following control operation; and a charge control unit for, when the head is positioned at the center of the destination track at the time of track following control operation, charging the capacitor in the integrating circuit in accordance with a predetermined voltage level corresponding to an offset amount determined by the position of the destination track.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an arrangement of a servo system according to an embodiment of the present invention;

FIG. 2 is a block diagram showing an arrangement of a carriage mechanism for HDD in the present embodiment;

FIG. 3 is a block diagram showing an integrating circuit and associated circuit in the servo system according to the embodiment of the present invention;

DETAILED DESCRIPTION OF THE PREFERRED EMBODIMENTS

Figure 4:
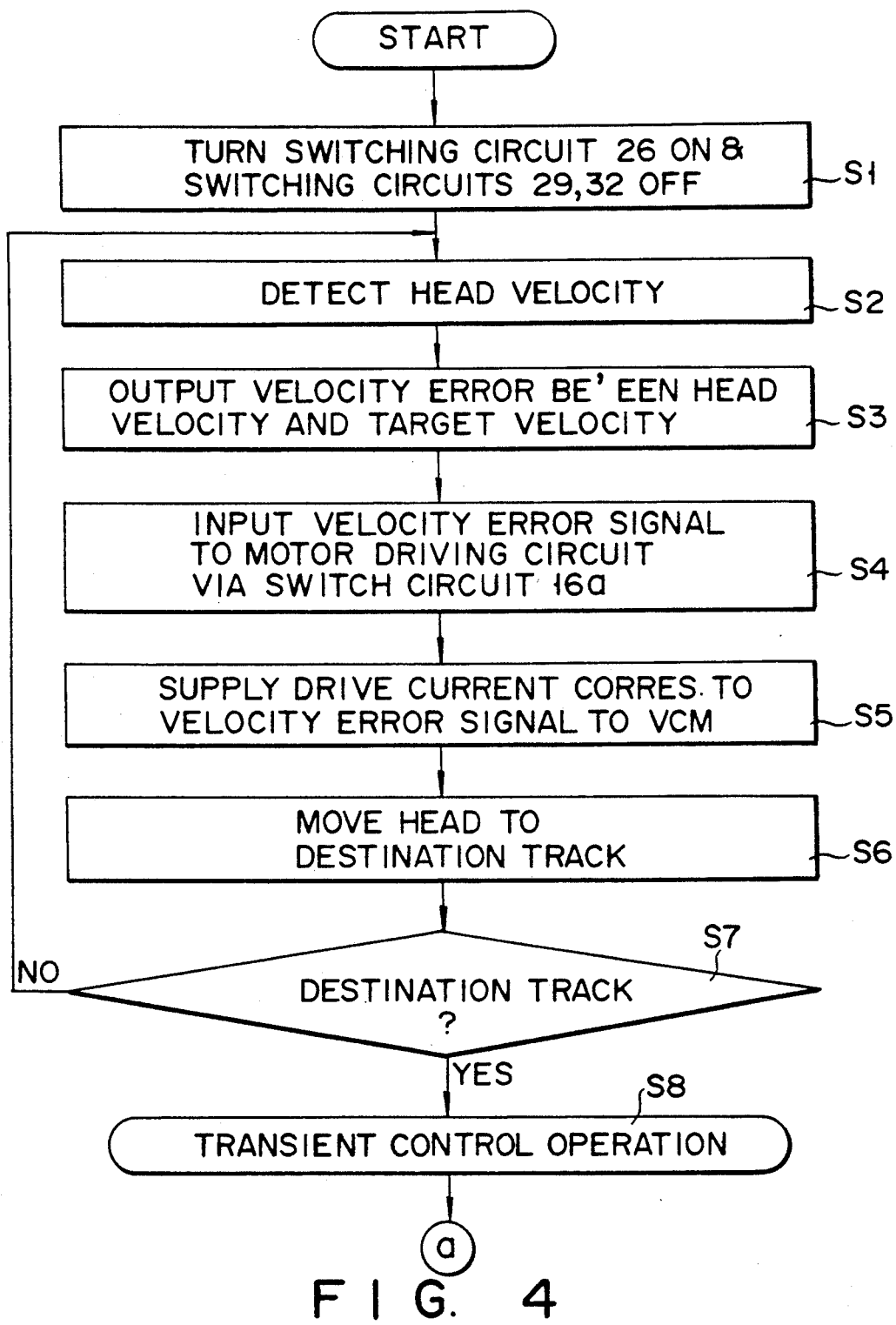
FIG. 4 is a flowchart for explaining a seek control operation by the present embodiment.
Figure 5:
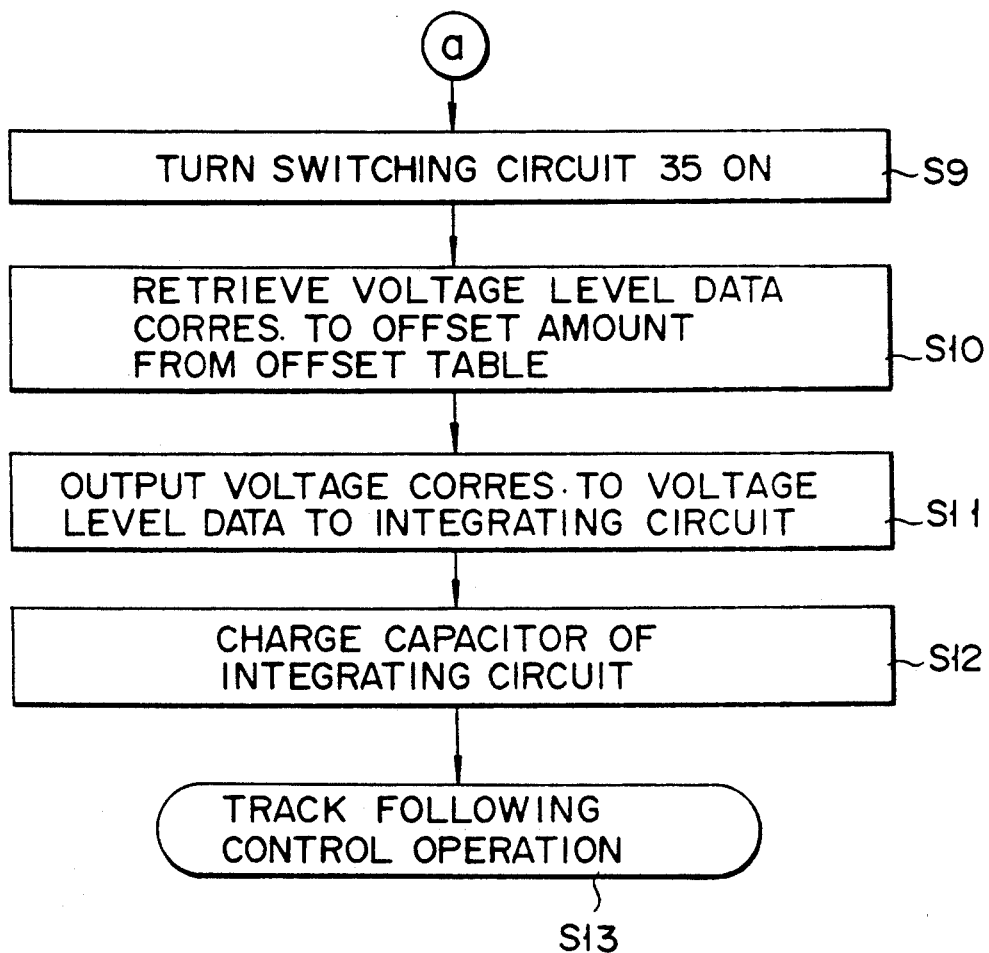
FIG. 5 is a flowchart for explaining an operation of an integration circuit of the present embodiment.

The embodiment of the present invention will be explained below with reference to the accompanying drawings.

In HDD, as shown in FIG. 2, a head 12 comprising a servo head 12a and plurality of data heads 12b is mounted on a carriage 10. The carriage 10 is driven by a voice coil motor (VCM) 11 to move the head 12 in a radial direction (arrows A) of disks 13. The disk 13 is rotationally driven by a motor, not shown. The servo head 12a seeks the servo surface 13a of the disk 13 to read servo data initially recorded on the servo surface 13a of the disk 13. The respective data head 12b follows the servo head 12a to seek over the data surface 13b of the disk 13 and to perform a read/write operation on data used by the user.

In the servo system, as shown in FIG. 1, a position signal generator 20 transforms servo data which is output from the servo head 12a to position signal PS. The position signal PS corresponds to a current track occupied by the data head 12b over the data surface 13b of the disk and becomes a zero level when the data head 12b occupies the center of the track (data track). A cylinder pulse generator 21 generates a cylinder pulse in synchronism with a zero crossing point in accordance with the position signal PS from the position transducer 20 and delivers it to a microprocessor (CPU)22. CPU22 counts cylinder pulses from the cylinder pulse generator 21 and calculates a distance of movement of the data head 12b. Thus the cylinder pulse generator 21 delivers a cylinder pulse each time the data head 12b moves across a track of the data surface 13b.

CPU22 calculates a distance of movement by the data head 12b from the current track to a destination track (designation cylinder) in accordance with a count value of cylinder pulses and calculates a target velocity corresponding to that distance of movement. The destination track data is supplied from an HDC, not shown, to CPU22. CPU22 retrieves a target velocity table initially memorized (not shown) and delivers target velocity data corresponding to the calculated distance. A D/A (digital to analog) converter 23 converts the target velocity data which is delivered by CPU22 to a voltage signal (target velocity signal TV).

A velocity detector 24 differentiates the position signal PS which is output from the position signal generator 20 and generates a velocity signal VS corresponding to an actual velocity at a moving time of the data head 12b. An error detector 25 comprising an operational amplifier 25 receives the target velocity signal TV and velocity signal VS from the D/A converter 23 and velocity detector 24, respectively, to deliver a velocity error signal between the two. A first switch circuit 26 is turned ON at a time of speed control operation and delivers a velocity error signal which comes from the error detector 25 to a motor driving circuit 27. The motor driving circuit 27 transforms a voltage signal, that is the velocity error signal, to a drive current. The drive current is supplied to a VCM11 for motor drive.

An adder 28 receives the velocity signal VS and position signal PS from the velocity detector 24 and position transducer 20, respectively, to add them together. A second switching circuit 29 is turned ON at a time of transient control operation and delivers a voltage signal, that is a result of addition, from the adder circuit 28 to a motor driving circuit 27. A fifth switching circuit 36 is turned ON at a time of track following operation and delivers the position signal PS from the position signal generator 20 to the integrating circuit 30. An integrating circuit 30 integrates the position signal PS from the position signal generator 20 to deliver a result of integration to a PCC (phase compensation circuit)31. PCC31 is composed of a filter, such as a notch filter and a lead lag filter. A third switching circuit 32 is turned ON at a time of track following operation to supply a compensated replica of the position signal PS coming from PCC31 to the motor driving circuit 27.

In the embodiment of the servo system, the integrating circuit 30 is connected to a series circuit of a fourth switching circuit 35, charge generator 34 and CPU33, as shown in FIG. 1, so as to have its capacitor supplied with a charge. CPU33 delivers data corresponding to a voltage level commensurate to an offset amount. The charge generator 34 transduces data coming from CPU33 to an analog voltage. The fourth switching circuit 35 is turned ON at a time of transient control operation and supplies a voltage which is generated from the charge generation 34 to the capacitor of the integrating circuit 30 for charging.

The integrating circuit 30 includes, as shown in FIG. 3, an operational amplifier 30a, series circuit of a resistor 30b and first capacitor 31a connected between the input terminal and the output terminal of the operational amplifier 30a, and second capacitor 31b connected in parallel with the first capacitor 31a. The fourth switching circuit 35 comprises a plurality of switch circuits 35a to 35c. The respective switch circuits 35a to 35c receive switch control signals SW1 to SW3, respectively, output from CPU33 and allow respective switching operations. Switch circuit 35a performs an ON/OFF operation in accordance with the switch control signal $SW_1$, and switch circuit 35b performs an ON/OFF operation in accordance with switch control signal $SW_2$. Switch control signals $SW_1$ and $SW_2$ are output from CPU 33 such that switch circuits 35a and 35b can simultaneously perform the ON/OFF operations. Also, switch circuits 35a and 35b are controlled such that both of them are turned OFF when switch circuit 35c is turned ON. A voltage from the charge generator 34 is supplied to the switch circuit 35c. The charge generator 34 includes a D/A converter 34 for converting the data coming from CPU33 to an analog voltage. CPU33 retrieves an offset table initially stored and selects a voltage level corresponding to the offset amount. The offset table, if being broadly classified into an outer, intermediate and inner areas, contains voltage levels corresponding to offset amounts for each area.

The operation of the present embodiment will be explained below.

Upon receiving a seek instruction from the host computer in the present servo system, a seek operation is initially carried out. At the time of seek operation, as shown in FIG. 4, step S1 turns the first switching circuit 26 ON and the second and third switching circuits 29 and 32 OFF. At the time of seek operation, the head 12 is moved from the current position to the destination track. The destination track data is supplied from HDC to CPU33. The servo head 12a reads the initially recorded servo data out of the servo surface 13a of the disk 13. The position signal generator 20 transforms servo data which is output from the servo head 12a to a position signal PS.

The velocity detector 24 differentiates the position signal PS supplied to the position signal generator 20 and delivers a velocity signal VS corresponding to an actual speed at the time of movement of the data head 12a (step S2). The cylinder pulse generator 21 delivers a cylinder pulse each time the data head 12b is moved across the track of the data surface 13b of the disk. CPU22 counts cylinder pulses and calculates a distance of movement by the data head 12b from the current track in accordance with the count value. CPU22 retrieves the initially prepared target velocity table, not shown, for target velocity data corresponding to the distance of movement of the servo head 12a. The D/A converter 23 converts target velocity data which is supplied from CPU22 to a target velocity signal TV which is composed of a voltage signal. The error detector 25 receives the target velocity signal TV and velocity signal VS from the D/A converter 23 and velocity detector 24, respectively, to deliver a velocity error signal (step S3). The first switching circuit 26, being turned ON, delivers the velocity signal to the motor driving circuit 27 (step S4). The motor driving circuit 27 transforms a voltage signal, that is a velocity error signal, to a drive current and supplies the drive current to VCM11 (step S5). VCM11 is driven in accordance with a drive current to cause the carriage 10 to be driven. The data head 12b is moved to the destination track with a target velocity calculated by CPU22 (step S6).

Upon the movement of the servo head 12a by the speed control operation nearer to the destination track, the second switching circuit 29 is turned ON, effecting a shift to a transient control operation mode (step S8). At this time, the first and third switching circuits 26 and 32 are turned OFF. At the time of the transient control operation, the adder 28 receives the velocity signal VS and position signal PS from the velocity circuit 24 and position signal generator 20, respectively, to add the two together. The second switch circuit 29 allows a voltage signal, that is a result of addition, of the adder 28 to the motor driving circuit 27. The motor driving circuit 27, after the voltage signal has been converted to a drive current, supplies it to VCM11. VCM11 is driven to allows the data head 12b to be moved just over the destination track.

In the track following control operation, when the head 12 is positioned, by the rotational variation of the disk 13, just over the center of the destination track, a positional displacement sometimes occurs due to the generation of an offset. In order to eliminate such an offset, the integrating circuit 30 is provided for integrating the position signal PS in a low-pass frequency region.

At this time, CPU 33 delivers a switch control signal SW3, turning on the switch circuit 35c in the switching circuit 35 (step S9). CPU33 receives data for designating the data head's destination track from HDC and retrieves the offset table 33a for corresponding voltage level data in accordance with the position of the destination track (step S10). When the disk is broadly classified into an outer, intermediate and inner area for respective tracks, an offset table 33a contains, as entered data, voltage level data corresponding to offset amounts for the respective areas. The D/A converter 34a in the charge generator 34 converts data which is delivered from CPU33 to an analog voltage and delivers it to the switch circuit 35c. The charge generator 34 charges the second capacitor 31b in the integrating circuit 30 via the switching circuit 35c with the use of a voltage corresponding to a voltage level which is supplied from CPU33 (steps S11, S12). At this time, the respective switch circuits 35a and 35b are turned OFF.

The charging of the second capacitor 31b is completed with of the transient control operation. Next, control operation shift from the transient control operation to the track following control operation (step S13). At this time, a fifth switching circuit 36 is turned ON and delivers the position signal PS from the position signal generator 20 to the integrating circuit 30. Therefore, as shown in FIG. 3, the charging of the first capacitor 31a is started by the position signal PS.

Upon a shift from the transient control operation to the track following control operation, as shown in FIG.

5, the third switching circuit 32 is turned ON with the first and second switching circuits 26, 29 OFF (step S10). The integrating circuit 30 integrates the position signal PS coming from the position signal generator 20 and delivers a result of integration to PCC31. The third switching circuit 32 allows a compensated replica of the position signal PS which is output from PCC31 to be delivered to the motor driving circuit 27. The motor driving circuit 27, after the compensated replica coming from PCC31 has been converted to a drive current, delivers it to VCM11. VCM11 drives the carriage 10 to cause the servo head 12a to be moved to the center of the destination track. Put another way, a negative feedback is implemented, in the track following control operation, to allow the position signal PS to become zero, meaning that the head 12 is positioned at the center of the destination track.

CPU33 delivers switch control signals SW1 and SW2, turning ON the corresponding switch circuits 35a and 35b at which time the switch circuit 35c is turned OFF. By so doing, the integrating circuit 30 implements an integral action due to its own resistor 30b, first capacitor 31a, and second capacitor 31b connected in parallel with the first capacitor 31a. At the time of track following control operation, the integrating circuit 30 receives a voltage corresponding to an offset amount before the start of the integral action to allow its capacitor to be charged. Immediately before a shift to the track following control operation, therefore, the integrating circuit 30 commences an integral action necessary to eliminate an offset of the head.

In the present servo system, the integrating circuit 30 has its capacitor charged to an amount corresponding to an offset amount at the time of track following control operation. Thus the integrating circuit 30 implements an integral action on the position signal PS, immediately subsequent to a shift to the track following control operation, so that the offset amount may be eliminated. Even if an offset amount is relatively great, it is possible to perform an integral action for offset elimination, in a brief period of time in accordance with the head's destination track. In accordance with the output signal of the integrating circuit 30, it is possible to, in a short period of time, perform a track following control operation by which the data head 12b is positioned over the center of the destination track. As a result, the time in which the head is positioned just over the destination track can be shortened, enabling access to be gained to the disk's track by the head at high speed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A head positioning control apparatus for a data storage device, comprising:
    a recording medium having a plurality of data tracks and having initially recorded servo data for head positioning;
    a head for recording and reproducing data into and from a destination track which is among the data tracks;
    position signal generator means for generating a position signal corresponding to a current position of the head in accordance with the servo data which is read out of the recording medium by the head;
    offset control means for generating an offset control signal corresponding to an offset value determined in accordance with the position of the destination track before a track following control operation;
    integrating means for, at a track following operation time, integrating the position signal output from the position signal generator means in accordance with the offset control signal on generating an output; and
    head driving means for moving the head to the destination track and for positioning the head to a center of the destination track at a time of track following control operation in accordance with the result output from the integration means.

2. The apparatus according to claim 1, wherein said integrating means comprises;
    an operational amplifier;
    a first capacitor for charging the position signal from the position signal generator;
    a second capacitor for changing the offset control signal from the offset control means; and
    means for outputting a result of integration.

3. The apparatus according to claim 1, further comprising position compensating means for receiving a result of integration by said integrating means, for phase compensating the received integration result and for outputting a result of compensation as a position control signal to the head driving means.

4. The apparatus according to claim 1, wherein said offset control means comprises:
    memory table means for storing a plurality of offset data in accordance with the position of the destination track;
    means for reading offset data corresponding to the destination track from the memory table means; and
    a digital to analog converter for allowing the offset data which is read by the reading means to be delivered as the offset control signal.

5. A head positioning control apparatus for a data storage device, comprising:
    a recording medium having a plurality of data tracks and having initially recorded servo data for head positioning;
    a head for recording and reproducing data into and from a destination track which is among the data tracks;
    position signal generator means for generating a position signal corresponding to a current position of the head in accordance with the servo data which is read out of the recording medium by the head;
    offset control means for generating an offset control signal corresponding to an offset value determined in accordance with the position of the destination track before a track following control operation;
    integrating means, including a first capacitor and a second capacitor selectively coupled in parallel with the first capacitor, for integrating the position signal in accordance with an offset control signal charged into the second capacitor from the offset control means, and for outputting a result of integration; and
    head driving means for moving the head to the destination track and for positioning the head to a center of the destination track at a time of track following control operation in accordance with the result output from the integrating means.

6. The apparatus according to claim 5, wherein said offset control means is provided with;
   offset table means for storing a plurality of offset data corresponding to positions of the destination tracks on the recording medium;
   digital to analog converter means for reading, from the offset table means, offset data corresponding to the destination track on which the head is positioned, and for converting the read offset data into the offset control signal; and
   means for charging the second capacitor with the offset control signal before the track following control operation.

7. The apparatus according to claim 6, further comprising:
   switch means for selectively coupling the digital to analog converter means to the second capacitor before execution of the track following control operation; and
   switch control means for turning on the switch means so as to charge the second capacitor with the offset signal supplied from the digital to analog converter means.

8. The apparatus according to claim 5, further comprising:
   switch means for selectively connecting the first and second capacitors of the integrating means in parallel to each other; and
   switch control means for turning off the switch means when the offset control means charges the second capacitor with the offset control signal, and for turning on the switch means after the charging operation is finished, thereby controlling parallel connection between the first and second capacitors.

9. The apparatus according to claim 5, further comprising:
   first and second switch means for selectively connecting the first and second capacitors of the integrating means in parallel to each other;
   third switch means for selectively connecting the offset control means to the second capacitor to each other;
   switch control means for turning off the first and second switch means and turning on the third switch means when the offset control means charges the second capacitor with the offset control signals, and for turning off the third switch means and turning on the first and second switch means when the charging operation is finished, thereby controlling parallel connection between the first and second capacitors.

* * * * *